(12) United States Patent
Teichmann et al.

(10) Patent No.: US 10,862,301 B2
(45) Date of Patent: Dec. 8, 2020

(54) SYSTEMS AND METHODS FOR POWER GENERATION USING FUEL CELLS

(71) Applicant: CUMMINS ENTERPRISE LLC, Indianapolis, IN (US)

(72) Inventors: Ralph Teichmann, Niskayuna, NY (US); Honggang Wang, Clifton Park, NY (US)

(73) Assignee: CUMMINS ENTERPRISE LLC, Indianapolis, IN (US)

( * ) Notice: Subject to any disclaimer, the term of this patent is extended or adjusted under 35 U.S.C. 154(b) by 260 days.

(21) Appl. No.: 15/869,025

(22) Filed: Jan. 11, 2018

(65) Prior Publication Data
US 2019/0214663 A1    Jul. 11, 2019

(51) Int. Cl.
*H02J 3/00* (2006.01)
*H01M 8/04537* (2016.01)
*H02M 7/797* (2006.01)
*H02J 3/38* (2006.01)
(Continued)

(52) U.S. Cl.
CPC ............. *H02J 3/00* (2013.01); *H01M 8/0488* (2013.01); *H01M 8/04559* (2013.01); *H02J 3/387* (2013.01); *H02M 7/797* (2013.01); *H01M 8/04268* (2013.01); *H02J 2300/30* (2020.01)

(58) Field of Classification Search
CPC .......... H02J 3/00; H02J 3/387; H02J 2300/30; H01M 8/04559; H01M 8/0488; H01M 8/04268; H02M 7/797
See application file for complete search history.

(56) References Cited

U.S. PATENT DOCUMENTS

| 6,812,587 | B2 | 11/2004 | Gilbreth et al. |
| 7,880,334 | B2 | 2/2011 | Evans et al. |
| 8,263,276 | B1 | 9/2012 | Gurunathan et al. |

(Continued)

FOREIGN PATENT DOCUMENTS

| EP | 2587612 B1 | 9/2014 |
| WO | 2004093233 A1 | 10/2004 |

OTHER PUBLICATIONS

Z Miao et al., "Study of a Fuel Cell Power Plant in Power Distribution System—Part I: Dynamic Model", Power Engineering Society General Meeting, 2004. IEEE, vol. 02, pp. 2220-2225, 2004, Denver, CO.

(Continued)

*Primary Examiner* — Carlos Amaya
(74) *Attorney, Agent, or Firm* — Barnes & Thornburg LLP (57) ABSTRACT

A fuel cell based power generation system is presented. The fuel cell based power generation system includes a fuel cell assembly configured to generate a DC power, at least one assembly switching element configured to operatively couple the fuel cell assembly to a first DC bus, at least one converter coupled between the first DC bus and an electrical grid, a plurality of auxiliary loads operatively coupled to the first DC bus at a location between the at least one assembly switching element and the at least one converter, where at least one of the plurality of auxiliary loads is configured to receive power from the fuel cell assembly via the at least one assembly switching element, and a controller operatively coupled to the at least one converter, where the controller is configured to allow a voltage of the first DC bus to fluctuate within a range of voltage values.

11 Claims, 5 Drawing Sheets

(51) Int. Cl.
    *H01M 8/04858*     (2016.01)
    *H01M 8/04223*     (2016.01)

(56)            References Cited

U.S. PATENT DOCUMENTS

| | | | |
|---|---|---|---|
| 8,373,381 | B2 | 2/2013 | Raiser et al. |
| 9,054,385 | B2 | 6/2015 | Jones et al. |
| 9,478,985 | B2 | 10/2016 | Ballantine et al. |
| 2005/0184594 | A1 | 8/2005 | Fredette |
| 2010/0188869 | A1* | 7/2010 | Fredette ............ H02M 1/10 363/15 |
| 2011/0217615 | A1* | 9/2011 | Smith ............ H01M 8/04947 429/452 |
| 2013/0099720 | A1* | 4/2013 | Chuah ............ H02J 7/0071 320/101 |
| 2013/0253716 | A1 | 9/2013 | Gross |
| 2014/0302415 | A1 | 10/2014 | Peterson |
| 2017/0070088 | A1 | 3/2017 | Berntsen et al. |

OTHER PUBLICATIONS

G Mehta et al., "Grid-interfacing Fuel Cell system with active and reactive power flow control", Sustainable Energy and Intelligent Systems (SEISCON 2011), International Conference on, pp. 554-559, Jul. 20-22, 2011, Chennai, Tamil Nadu.

Extended European Search Report and Opinion issued in connection with corresponding EP Application No. 19150670.8 dated Dec. 11, 2019.

\* cited by examiner

SYSTEMS AND METHODS FOR POWER GENERATION USING FUEL CELLS

BACKGROUND

Embodiments of the present specification generally relate to a fuel cell based power generation system and method of operating the fuel cell based power generation system, and more particularly to systems and methods for powering auxiliary subunits of the fuel cell based power generation system.

As will be appreciated, a fuel cell based power generation system includes a stack of fuel cells, auxiliary subunits, and associated circuitry. The auxiliary subunits typically include a fuel blower, an air blower, an air ventilator, associated motors, and the like. Initially, the auxiliary subunits are powered using an external power source, which in turn aids in heating the stack of fuel cells. Typically, the stack of fuel cells is heated for a time-period in a range from about 8 hours to about 12 hours until the stack of fuel cells attains a determined temperature at which the stack of fuel cells starts generating electric power. The longer the time required for heating up the stack of fuel cells, the more power is consumed from the external power source for powering of the auxiliary subunits. After the stack of fuel cells starts generating electric power, the electric power required for powering the auxiliary subunits is provided from the heated stack of fuel cells.

Different systems and techniques for providing power to the auxiliary subunits have been proposed. Conventional systems used for providing power to the auxiliary subunits call for use of power converters such as direct current (DC)-DC converters, buck boost converters, and the like. Generally, the auxiliary subunits are coupled to a DC bus and the stack of fuel cells is coupled to the DC bus via power converters.

Further, certain other conventional systems for providing power to the auxiliary subunits entail coupling the auxiliary subunits to both the DC bus and an alternating current (AC) bus. In some scenarios, such systems use three stage power conversion units (DC-AC-DC-AC). Use of the DC-DC converters, the buck boost converters, and/or the three stage power conversion units for powering the auxiliary subunits adds to cost, footprint, and complexity of the power generation systems and reduces efficiency.

BRIEF DESCRIPTION

In accordance with aspects of the present specification, a fuel cell based power generation system is presented. The fuel cell based power generation system includes a fuel cell assembly configured to generate a DC power. Further, the fuel cell based power generation system includes at least one assembly switching element configured to operatively couple the fuel cell assembly to a first direct current (DC) bus. Furthermore, the fuel cell based power generation system includes at least one converter coupled between the first DC bus and an electrical grid. Moreover, the fuel cell based power generation system includes a plurality of auxiliary loads operatively coupled to the first DC bus at a location between the at least one assembly switching element and the at least one converter, where at least one of the plurality of auxiliary loads is configured to receive power from the fuel cell assembly via the at least one assembly switching element and a controller operatively coupled to the at least one converter, where the controller is configured to allow a voltage of the first DC bus to fluctuate within a range of voltage values.

In accordance with another aspect of the present specification, a method for operating a fuel cell based power generation system, where the fuel cell based power generation system includes a fuel cell assembly, at least one assembly switching element and a plurality of auxiliary loads operatively coupled to a first direct current (DC) bus is presented. The method includes heating the fuel cell assembly in a plurality of stages, where the plurality of stages includes at least a first stage and a second stage. The heating the fuel cell assembly includes during the first stage of the plurality of stages, powering at least one first auxiliary load corresponding to a portion or portions of the fuel cell assembly to heat the portion or portions of the fuel cell assembly. Further, heating the fuel cell assembly includes generating, using the portion or portions of the fuel cell assembly, a first DC power. Additionally, heating the fuel cell assembly includes during the second stage of the plurality of stages, powering at least one second auxiliary load corresponding to another portion or portions of the fuel cell assembly to heat the another portion or portions of the fuel cell assembly based at least in part on the first DC power to generate a second DC power.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Unless defined otherwise, technical and scientific terms used herein have the same meaning as is commonly understood by one of ordinary skill in the art to which this disclosure belongs. The terms "first," "second," and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. The term "operatively coupled," as used herein, refers to direct and indirect coupling. Furthermore, the terms "circuit" and "circuitry" and "controller" may include either a single component or a plurality of components, which are either active and/or passive and are connected or otherwise coupled together to provide the described function.

As will be described in detail hereinafter, various embodiments of a fuel cell based power generation system and a method for operating the fuel cell based power generation system are presented. The exemplary fuel cell based power generation system may be employed in distributed power generation applications, micro-power generation, small-scale energy generation, and/or larger-scale applications, such as power plants or power stations. Also, the exemplary fuel cell based power generation system may be used in the automotive industry. The fuel cell based power generation system employs at least one switching element for coupling a fuel cell assembly to a direct current (DC) bus. In one specific embodiment, the switching element is devoid of controllable semiconductor switches, thereby reducing operational complexity and cost of the fuel cell based power generation system. Further, the DC bus is coupled to an electrical grid via a bidirectional converter.

Furthermore, the fuel cell assembly includes a plurality of fuel cell units coupled to one another. The exemplary method for operating the fuel cell based power generation system involves heating the fuel cell assembly in a plurality of stages. In one example, the fuel cell based power generation system involves heating the fuel cell assembly in two stages. In particular, auxiliary loads corresponding to the fuel cell assembly are powered in two stages. Accordingly, a start-up operation of the fuel cell based power generation system includes at least a first stage and a second stage.

Moreover, the powered auxiliary load aids in heating the fuel assembly. Initially, the auxiliary loads in the fuel cell based power generation system are powered by an external power source. Further, at the first stage of the start-up operation of the fuel cell based power generation system, a first set of fuel cell units in the fuel cell assembly is heated based on the power provided to auxiliary loads corresponding to the first set of fuel cell units from the external power source. The first set of fuel cell units starts generating power upon attaining a determined temperature value.

During the second stage of the start-up operation of the fuel cell based power generation system, in addition to the power drawn from the external power source, the power generated by the first set of fuel cell units aids in powering all the auxiliary loads corresponding to the fuel cell assembly. Consequently, a second set of the remaining fuel cell units is also heated. In one embodiment, once the power generated by the first set of fuel cell units is sufficient to power all the auxiliary loads, drawing power from the external power source to power the auxiliary loads may be ceased. Hence, use of exemplary method aids in reducing power consumed by the auxiliary loads from the external power source for heating the fuel cell assembly when compared to conventional methods of heating a fuel cell assembly where all the fuel cell units of the fuel cell assembly are heated together.

Figure 1:
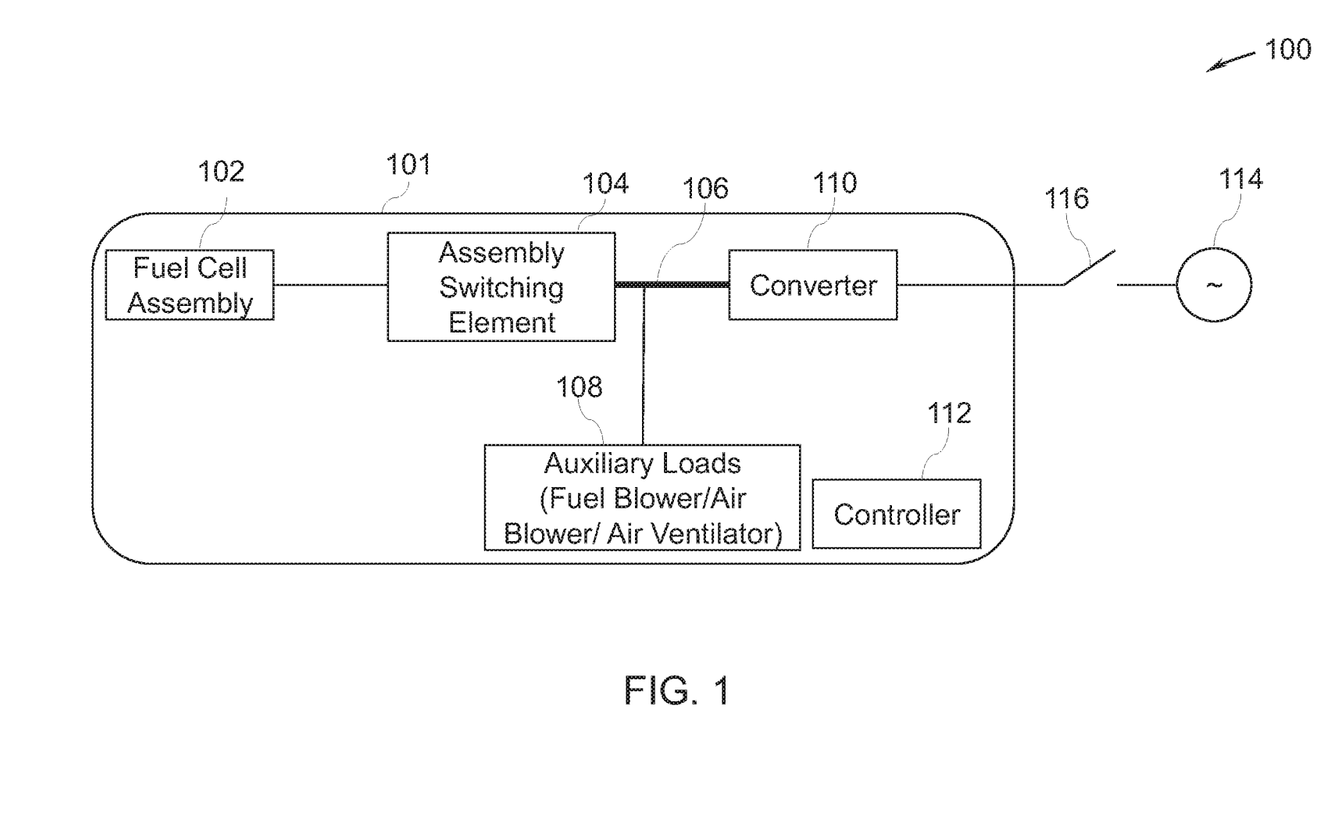
FIG. 1 is a diagrammatical representation of an exemplary fuel cell based power generation system, according to aspects of the present specification.

Turning now to the drawings, FIG. 1 is a diagrammatical representation 100 of an exemplary fuel cell based power generation system, according to aspects of the present specification. In particular, FIG. 1 depicts a fuel cell based power generation system 101 including a fuel cell assembly 102, at least one assembly switching element 104, a first DC bus 106, auxiliary loads 108, a converter 110, and a controller 112. As used herein, the term "controller" refers to integrated circuits (ICs), a computer, a microcontroller, a microcomputer, a programmable logic controller (PLC), an application specific integrated circuit (ASIC), application-specific processors, digital signal processors (DSPs), field programmable gate arrays (FPGAs), and/or any other programmable circuits.

The fuel cell based power generation system 101 is coupled to an electrical grid 114. In one embodiment, the electrical grid 114 may function as an external power source. In addition, the fuel cell based power generation system 101 may be coupled to other external power sources such as a battery, an uninterruptible power supply, a solar power generation system, a wind based power generation system, a thermoelectric device, another fuel cell based power generation system, or the like.

In one embodiment, the first DC bus 106 is a main DC bus. The fuel cell assembly 102 is coupled to the first DC bus 106 via the assembly switching element 104. In accordance with aspects of the present specification, the assembly switching element 104 includes a diode coupled in series with a switch. The switch may include a fuse, a relay, a manually operated switch, mechanically operated switch, an electromechanically operated switch, a magnetically operated switch, or the like. Further, in one embodiment, the diode is a blocking diode. In one embodiment, when a non-controllable switch is used, cost and complexity of the fuel cell based power generation system 101 may be reduced.

Further, the first DC bus 106 is coupled to the converter 110. The converter 110 is further coupled to the electrical grid 114 via a connector 116. The connector 116 may include a disconnect switch, for example, employed to couple or de-couple the electrical grid 114 from the fuel cell based power generation system 101 based on operating conditions. In one embodiment, the converter 110 is a bidirectional inverter. The converter 110 is configured to transfer electrical power between the electrical grid 114 and at least one of the auxiliary loads 108 and the fuel cell assembly 102. The electrical power may be at least one of a DC power and an AC power.

Moreover, the fuel cell assembly 102 includes a plurality of fuel cell units (shown in FIG. 2), where the fuel cell units are operatively coupled to one another. Further, each fuel cell unit may include a plurality of fuel cell subunits (shown in FIG. 3) coupled to one another. Also, each fuel cell subunit may include a stack of fuel cells (not shown) coupled to one another. Moreover, each of the fuel cells includes a cathode, an anode, and an electrolyte.

The auxiliary loads 108 are operatively coupled to the first DC bus 106. Particularly, the auxiliary loads 108 are coupled to the first DC bus 106 at a location between the assembly switching element 104 and the converter 110. In one embodiment, the auxiliary loads 108 are directly coupled to the first DC bus 106. In another embodiment, the auxiliary loads are indirectly coupled to the first DC bus 106 (as shown below in the embodiment of FIG. 4, for example). During the startup operation of the fuel cell based power generation system 101, the auxiliary loads 108 are powered using power drawn from the electrical grid 114 via the converter 110. In accordance with exemplary aspects of the present specification, the fuel cell assembly 102, once at least partially available, is also configured to provide power to the auxiliary loads 108. In particular, the power generated by the fuel cell assembly 102 is conveyed to the first DC bus 106 via the assembly switching element 104. Subsequently, the power generated by the fuel cell assembly 102 is conveyed from the first DC bus 106 to the auxiliary loads 108. The auxiliary loads 108 include a fuel blower, an air blower, an air ventilator, and the like.

In one embodiment, each fuel cell unit may have a corresponding auxiliary load 108. In certain embodiments, each fuel cell subunit may also have a corresponding auxiliary load 108. It may be noted that typically in fuel cell based power generating systems, the voltage of the DC bus is maintained at a single value. However, maintaining the voltage of the DC bus at the single value does not allow use of the DC bus to cater to different voltage requirements of all the auxiliary loads that are operatively coupled to the DC bus. Shortcomings of the presently existing systems are circumvented by the fuel cell based power generation system 101.

To that end, the controller 112 is configured to allow a voltage of the first DC bus 106 to fluctuate within a range of voltage values. In one example, the controller 112 is configured to control the operation of the converter 110 to allow the voltage of the first DC bus 106 to fluctuate within the range of voltage values. In certain embodiments, the range of voltage values may include a lower limit and an upper limit of the voltage values. In one example, if a lower voltage limit of the fuel cell assembly 102 is greater than a lower voltage limit of the auxiliary loads 108, the lower limit of the range of voltage values of the first DC bus 106 is equivalent to the lower voltage limit of the fuel cell assembly 102. In another example, if the lower voltage limit of the auxiliary loads 108 is greater than the lower voltage limit of the fuel cell assembly 102, the lower limit of the range of voltage values of the first DC bus 106 is equivalent to the lower voltage limit of auxiliary loads 108.

It may be noted that if the voltage across the fuel cell assembly 102 is lower than the lower voltage limit of the fuel cell assembly 102, the anode of the fuel cell assembly 102 may be oxidized, which in turn may adversely impact the fuel cell assembly 102. Additionally, if the voltage provided to the auxiliary loads 108 is lower than the lower voltage limit of the auxiliary loads 108, the operation of the auxiliary loads 108 is impacted.

Additionally, the upper limit of the range of voltage values is determined based on the maximum value of voltage that the auxiliary loads 108 can withstand. It may be noted that if the voltage provided to the auxiliary loads 108 exceeds the maximum value of voltage that the auxiliary loads 108 can withstand, the auxiliary loads 108 may break down. In one example, the range of voltage values of the first DC bus 106 may be in a range from about 350 volts to about 370 volts. In another example, the range of voltage values of the first DC bus 106 may be in a range from about 345 volts to about 420 volts. Maintaining voltage of the first DC bus 106 in the range of voltage values aids in catering to the different requirements of all the auxiliary loads 108 that are coupled to the first DC bus 106.

Furthermore, in accordance with aspects of the present specification, the fuel cell assembly 102 having the plurality of fuel cell units is heated in two stages. In one embodiment, auxiliary loads 108 are configured to heat the fuel cell assembly 102 in a plurality of stages, such as the first stage and the second stage. In an even more specific embodiment, the auxiliary loads 108 corresponding to the plurality of fuel cell units are powered in two stages.

During the first stage of start-up operation of the fuel cell based power generation system 101, auxiliary loads corresponding to the first set of fuel cell units of the fuel cell assembly 102 are powered using power provided by the electrical grid 114. Powering of the auxiliary loads of the first set of fuel cell units aids in heating the first set of fuel cell units. Subsequently, the first set of fuel cell units generates power. Further, the power generated by the first set of fuel cell units is configured to power corresponding auxiliary loads.

Moreover, during the second stage of the start-up operation of the fuel cell based power generation system 101, auxiliary loads corresponding to a second set of fuel cell units of the fuel cell assembly 102 are powered using the power generated by the first set of fuel cell units. Consequent to the powering of the auxiliary loads corresponding to the second set of fuel cell units, the second set of fuel cell units is heated. Once the second set of fuel cell units is heated, the second set of fuel cell units starts generating power.

Subsequently, a portion of power generated by the first and second set of fuel cell units is provided to power the auxiliary loads corresponding to the first and second set of fuel cell units. The remaining portion of the power generated by the first and second set of fuel cell units is supplied to the electrical grid 114 via the converter 110. Since the power generated by the plurality of fuel cell units is employed to partially power the auxiliary loads during the start-up operation, the power consumed by the auxiliary loads from the external power source for heating the fuel cell assembly is considerably reduced. In one example, the plurality of fuel cell subunits may also be heated in two stages. The method of operating a fuel cell assembly will be described in greater detail with respect to subsequent figures.

Although the example of FIG. 1 depicts the fuel cell assembly 102 as being operatively coupled to the first DC bus 106 via a single assembly switching element 104, use of any number of assembly switching elements 104 is anticipated. Examples of the architecture and method of operation of the fuel cell based power generation system will be described in greater detail with respect to subsequent figures.

Figure 2:
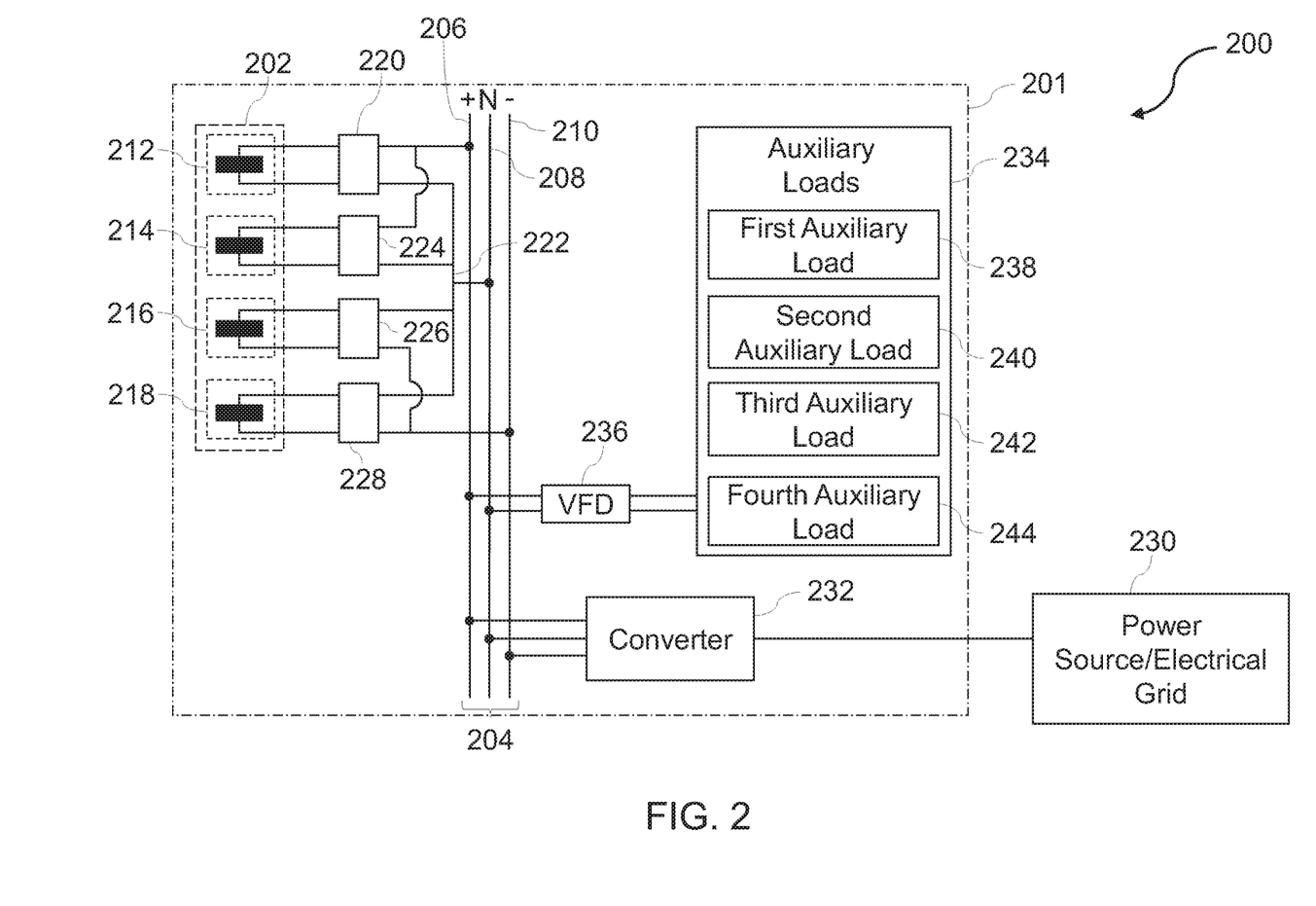
FIG. 2 is a diagrammatical representation of one embodiment of the fuel cell based power generation system of FIG. 1, according to aspects of the present specification.

Referring now to FIG. 2, a diagrammatical representation 200 of one embodiment of the fuel cell based power generation system 101 of FIG. 1, according to aspects of the present specification, is presented. In particular, FIG. 2 represents a detailed architecture of a 1 MW fuel cell based power generation system 201.

The fuel cell based power generation system 201 includes a fuel cell assembly 202. The fuel cell assembly 202 is operatively coupled to a first DC bus 204, such as the first DC bus 106 of FIG. 1. The first DC bus 204 includes a positive DC line 206, a neutral line 208, and a negative DC line 210.

In the example of FIG. 2, the fuel cell assembly 202 includes four fuel cell units 212, 214, 216, 218. For ease of explanation, the fuel cell units 212, 214, 216, and 218 may be referred to as first, second, third, and fourth fuel cell units. In one embodiment, each of the fuel cell units 212, 214, 216, 218 is configured to output a power of about 250 kW.

The first fuel cell unit 212 is operatively coupled to the first DC bus 204 via an assembly switching element 220. In particular, a positive terminal of the assembly switching element 220 is coupled to the positive DC line 206 and a negative terminal of the assembly switching element 220 is coupled to a common terminal 222. Similarly, the second, third, and fourth fuel cell units 214, 216, 218 are coupled to the first DC bus 204 via respective assembly switching elements 224, 226, 228. In particular, a positive terminal of the assembly switching element 224 is coupled to the positive DC line 206 and a negative terminal of the assembly switching element 224 is coupled to the common terminal 222. In a similar manner, negative terminals of the assembly switching elements 226, 228 are coupled to the negative DC line 210 and positive terminals of the assembly switching elements 226, 228 are coupled to the common terminal 222. The common terminal 222 is coupled to the neutral line/ground line 208.

Figure 3:
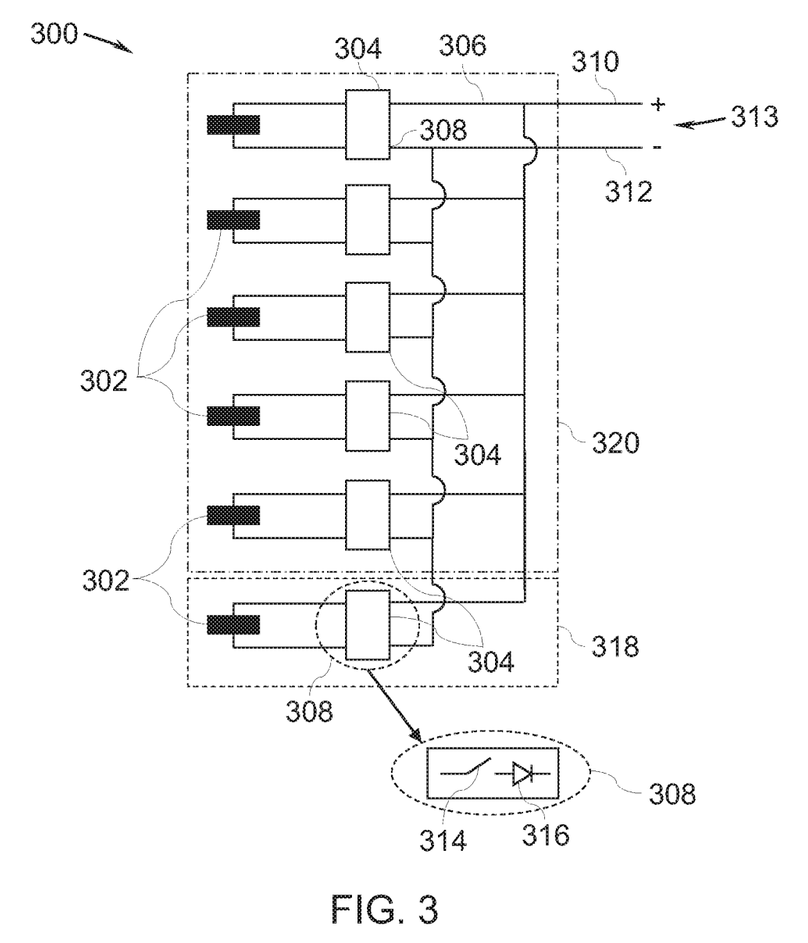
FIG. 3 is a diagrammatical representation of one embodiment of a fuel cell unit for use in the fuel cell based power generation system of FIG. 2, according to aspects of the present specification.

Each of the assembly switching elements 220, 224, 226, 228 includes a switch and optionally a diode in series with the switch (with an example of a switch and diode being shown in FIG. 3). In one embodiment, the switch is a non-controllable switch such as a relay. In another embodiment, the switch is a manually operated switch. As discussed above with respect to FIG. 1, use of other types of switches is also envisioned.

Furthermore, the fuel cell based power generation system 201 is operatively coupled to an external power source. In one embodiment, the external power source is an electrical grid 230. The fuel cell based power generation system 201 also includes a converter 232, such as the converter 110 of FIG. 1. The electrical grid 230 is coupled to the first DC bus 204 via the converter 232. In one embodiment, the converter 232 is a bidirectional inverter.

Additionally, the fuel cell based power generation system 201 includes auxiliary loads 234 that are operatively coupled to the first DC bus 204 via a variable frequency drive 236. The auxiliary loads 234 operate in conjunction with the fuel cell assembly 202. The auxiliary loads 234 may include air blower, fuel blower, air ventilators, and the like. The air blower, fuel blower, and air ventilators have associated motors. The variable frequency drive 236 is configured to control speed and torque of the motors associated with auxiliary loads 234 by varying a corresponding motor input frequency and/or voltage.

In the example of FIG. 2, the auxiliary loads 234 include a first auxiliary load 238, a second auxiliary load 240, a third auxiliary load 242, and a fourth auxiliary load 244. The first auxiliary load 238 corresponds to the first fuel cell unit 212, the second auxiliary load 240 corresponds to the second fuel cell unit 214, the third auxiliary load 242 corresponds to the third fuel cell unit 216, and the fourth auxiliary load 244 corresponds to the fourth fuel cell unit 218. In one embodiment, the first, second, third, and fourth auxiliary loads 238, 240, 242, 244 may be shared among the first, second, third, and fourth fuel cell units 212, 214, 216, 218.

As noted hereinabove, the fuel cell assembly 202 includes fuel cell units 212, 214, 216, and 218. Each of the fuel cell units 212, 214, 216, and 218 may include a plurality of fuel cell subunits (shown in FIG. 3). As noted hereinabove, the fuel cell assembly 202 may operate in conjunction with the corresponding auxiliary loads 234. In addition, the fuel cell assembly 202 operates in conjunction with components (not shown in FIG. 2) such as a natural gas pipeline, a burner, catalytic partial oxidation (CPOx) reformer, a heater, or the like.

In accordance with aspects of the present specification, a start-up operation of the fuel cell based power generation system 201 entails heating the fuel cell assembly 202 in a plurality of stages. In certain embodiments, the plurality of stages may include a first stage and a second stage of heating the fuel cell assembly 202.

Figure 5:
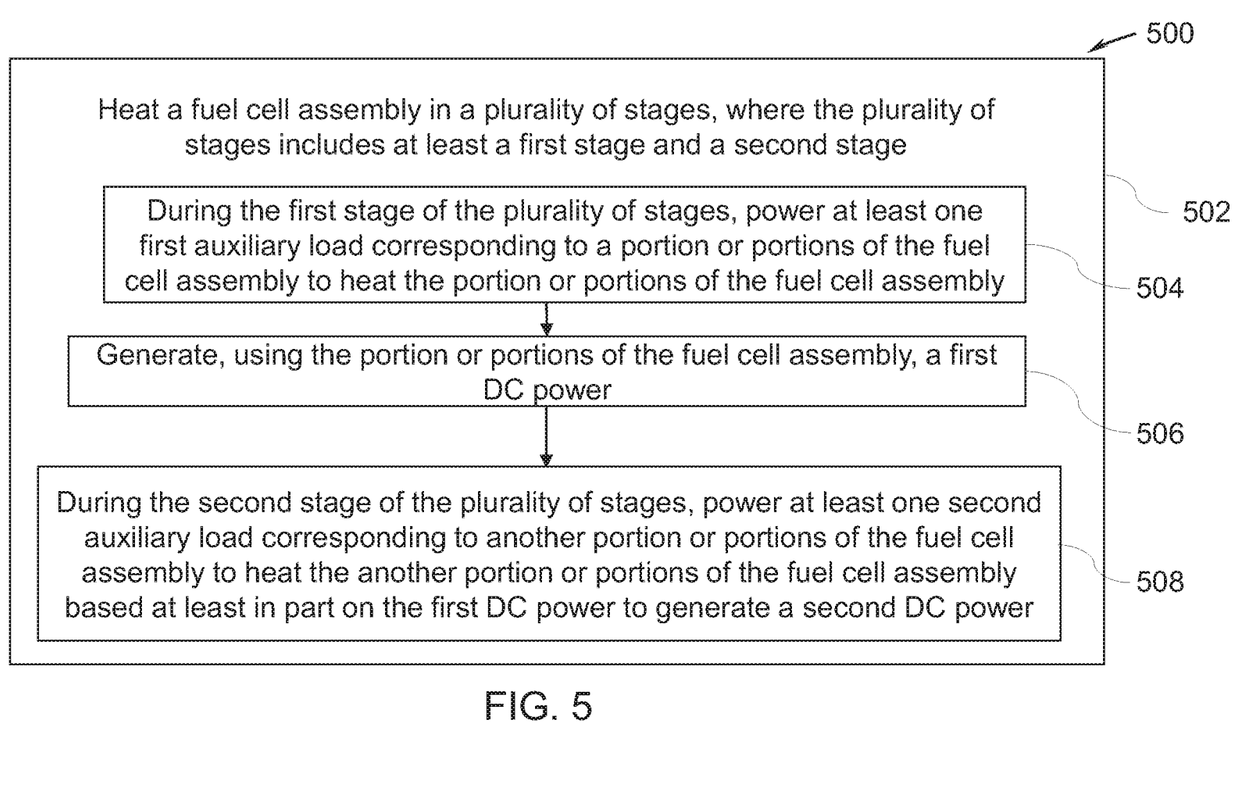
FIG. 5 is a flow chart representing a method for operating the fuel cell based power generation system of FIG. 1, according to aspects of the present specification.

During the first stage, at least one first auxiliary load corresponding to a portion or portions of the fuel cell assembly 202 is powered to heat the portion or portions of the fuel cell assembly 202. The portion or portions of fuel cell assembly 202 that have been heated may then be used to generate a first DC power. During the second stage, at least one second auxiliary load corresponding to another portion or other portions of the fuel cell assembly 202 is powered to heat the another portion or other portions of the fuel cell assembly 202 based at least in part on the first DC power to generate a second DC power. In one embodiment, the portion or portions of the fuel cell assembly 202 heated during the first stage include one or more of the plurality of fuel cell subunits, however, in another embodiment, the portion or portions of the fuel cell assembly heated during the first stage include one or more of the plurality of fuel cell units. The examples of FIG. 2 and FIG. 5 are described on a fuel cell unit basis and the example of FIG. 3 is described on a fuel cell subunit basis. Moreover, the portion or portions of the fuel cell assembly heated in the first stage may be either entire or partial fuel cell units.

In one example, the fuel cell assembly 202 may be heated in two stages. It may be noted that, in one embodiment, the number of fuel cells in the first fuel cell unit 212 is lower than the number of fuel cells in the combination of the other fuel cell units 214, 216, 218. In such an embodiment, the time required for heating the first fuel cell unit 212 is substantially lower than the time required for heating the combination of the other fuel cell units 214, 216, 218. Consequently, the first fuel cell unit 212 starts generating power within a shorter span of time, when compared to time required for generation of power by a combination of other fuel cell units 214, 216, 218. In one embodiment, the first fuel cell unit 212 is heated during a first stage of the start-up operation of the system 201 and the other fuel cell units 214, 216, 218 are heated during a second stage of the start-up operation of the system 201. As a result, the fuel cell assembly 202 starts generating power in a shorter time when compared to a scenario where a combination of the other fuel cell units 214, 216, 218 are heated during the first stage. Once the first fuel cell unit 212 starts generating power, the auxiliary loads 238, 240, 242, 244 are powered based at least in part on the power generated by the first fuel cell unit 212, thereby reducing import of power from the electrical grid 230.

In particular, during the first stage of the start-up operation of the fuel cell based power generation system 201, the first auxiliary load 238 corresponding to the first fuel cell unit 212 is powered using the electrical grid 230. In one embodiment, power from the electrical grid 230 is provided to the first auxiliary load 238 via the converter 232. In one example, the first auxiliary load 238 is an air blower. Accordingly, in this example, the amount of air blown from the air blower 238 is based on the power provided to the air blower 238 from the electrical grid 230. Further, the air from the air blower 238 is combined with fuel, such as natural gas provided from the natural gas pipeline and provided to the first fuel cell unit 212. At least one of the burner, the reformer, and the heater may be employed to heat the fuel before providing the fuel to the first fuel cell unit 212. Providing the fuel along with air from the air blower to the first fuel cell unit 212 aids in heating the first fuel cell unit 212.

Once the first fuel cell unit 212 is heated to attain a determined temperature value, the first fuel cell unit 212 begins to generate power. In this example, the power generated by the first fuel cell unit 212 may be referred to as a first DC power. Further, the power later to be generated by the other fuel cell units 214, 216, and 218 may be referred to as a second DC power. Finally, the power provided to the first auxiliary load 238 from the electrical grid 230 is referred to as a third DC power. In one example, the determined temperature value may be about 750° C. The first DC power is provided to the first auxiliary load 238 via the first DC bus 204 and the variable frequency drive. In one example, the first DC power is provided to the first auxiliary load 238 via the first DC bus 204 and the variable frequency drive when the assembly switching element 220 is in a closed state. It may be noted that, in one embodiment, the assembly switching element 220 is the closed state when a voltage at the first fuel cell unit is greater than voltage at the first DC bus 204. In another embodiment, the assembly switching element 220 is opened when a voltage at the first fuel cell unit 212 is lower than the voltage at the first DC bus 204.

Further, if the first DC power is sufficient to power the first auxiliary load 238, then the power being supplied to the first auxiliary load 238 from the electrical grid 230 may be terminated and the first DC power may be used to power the first auxiliary load 238.

Subsequently, at the second stage of start-up operation of the system 201, the auxiliary loads 240, 242, 244 are powered. In one embodiment, the auxiliary loads 240, 242, 244 are powered using the power provided from the electrical grid 230. In certain situations, the first DC power may be sufficient for powering additional auxiliary loads. Accordingly, in one example, additional auxiliary loads, such as the auxiliary load 240 may also be powered by the first DC power. Furthermore, in this example, the electrical grid 230 may continue to supply power to any remaining auxiliary loads, such as auxiliary loads 242, 244.

Also, if the first DC power provided to the first DC bus 204 is sufficient to power all the auxiliary loads 238, 240, 242, 244, the converter 232 is configured to stop the import of power from the electrical grid 230 for powering the auxiliary loads 238, 240, 242, 244. In this scenario, the auxiliary loads 238, 240, 242, 244 may be powered by the first DC power generated by the first fuel cell unit 212.

Supply of power to the second, third, and fourth auxiliary loads 240, 242, 244, results in the second, third, and fourth fuel cell units 214, 216, 218 being heated. Once the second, third, and fourth fuel cell units 214, 216, 218 attain a determined temperature value, the second, third, and fourth fuel cell units 214, 216, 218, respectively, generate power. This power generated by the second, third, and fourth fuel cell units 214, 216, 218 is provided to the auxiliary loads 238, 240, 242, 244 via the first DC bus 204. As noted hereinabove, the power generated by the second, third, and fourth fuel cell units 214, 216, 218 is referred to as a second DC power.

If a combination of the first and second DC powers provided to the first DC bus 204 exceeds the power required by the auxiliary loads 238, 240, 242, 244, the converter 232 is configured to direct any excess power to the electrical grid 230. In one example, if the power supplied to the first DC bus 204 is higher than a threshold value of power, the converter 232 is configured to direct the excess power to the electrical grid 230. In one example, the threshold value of power of the first DC bus 204 may be summation of the power requirement of all the auxiliary loads 238, 240, 242, 244. The phrase 'excess power,' as used herein, is representative of a difference between the power generated by the fuel cell units 212, 214, 216, 218 and the threshold value. In another example, if the power provided to the first DC bus 204 by the fuel cell units 212, 214, 216, 218 is lower than the threshold value, the converter 232 is configured to import power from the electrical grid 230. Consequently, the converter 232 is configured to "regulate" transfer of power between the electrical grid 230 and the first DC bus 204 thereby aiding in maintaining the voltage of the first DC bus 204 within the above-discussed range of voltage values.

As noted hereinabove, the auxiliary loads 238, 240, 242, 244 are powered using a combination of the power generated by the first fuel cell unit 212 and the power provided by the electrical grid 230 instead of entirely relying on the electrical grid 230 for powering the auxiliary loads 238, 240, 242, 244. In certain other scenarios, the auxiliary loads 238, 240-242, 244 may be entirely powered by the power generated by the first fuel cell unit 212 without importing any power from the electrical grid 230. Therefore, the amount of power consumed from the electrical grid 230 to power the auxiliary loads 238, 240, 242, 244 of the fuel cell based power generation system 201 is substantially lower when compared to the power consumed by a conventional fuel cell based power generation system. By way of example, a conventional 1 MW fuel cell based power generation system uses about 800 kWh to heat the fuel cell assembly. However, by implementing the 1 MW fuel cell based power generation system 200 as described hereinabove, the power required for heating the fuel cell assembly 202 is about 20 kWh, thereby resulting in a reduction in the power consumption of about 780 kWh. In one example, the amount of power drawn from the electrical grid 230 to power the auxiliary loads 234 of the fuel cell assembly 202 is reduced from 800 kWh to 20 kWh.

Although the example of FIG. 2 represents the auxiliary loads 234 as including the first, second, third, and fourth auxiliary loads 238, 240, 242, 244, different arrangements of the auxiliary loads are envisaged. Further, although the example of FIG. 2 represents use of only a single variable frequency drive to couple the first, second, third and fourth auxiliary loads to the first DC bus, use of different number of variable frequency drives is envisaged. Also, different techniques of coupling of the first, second, third, and fourth auxiliary loads to the first DC bus may be anticipated.

FIG. 3 is a diagrammatical representation 300 of one embodiment of a fuel cell unit for use in the fuel cell based power generation system 201 of FIG. 2, according to aspects of the present specification. In particular, FIG. 3 represents one fuel cell unit such as the fuel cell units 212, 214, 216, 218.

The fuel cell unit 300 includes a plurality of fuel cell subunits 302 and a plurality of subunit switching elements 304. One fuel cell subunit 302 is coupled to another fuel cell subunit 302 via a corresponding subunit switching element 304. Further, positive terminals 306 of the subunit switching elements 304 are coupled together to form a positive DC line 310. Similarly, negative terminals 308 of the subunit switching elements 304 are coupled together to form a negative DC line 312. A combination of the positive DC line 310 and the negative DC line 312 forms a subunit DC bus 313. The subunit DC bus 313 may be coupled to a first DC bus, such as the first DC bus 204 of FIG. 2. Further, the first DC bus is coupled to an electrical grid. Therefore, the subunit DC bus 313 is coupled to the electrical grid via the first DC bus.

Each subunit switching element 304 typically includes a switch 314 and a blocking diode 316. The switches 314 may include the same types of switches discussed above with respect to the fuel cell assembly and units. The subunit switching element 304 aids in de-coupling/coupling the fuel cell subunit 302 from the subunit DC bus 313 and thus, from the first DC bus 204. The de-coupling of the fuel cell subunit 302 from the subunit DC bus 313 aids in preventing backflow of current to the fuel cell subunit 302 from the electrical grid.

Further, each fuel cell subunit 302 includes a plurality of fuel cells. Reference numeral 318 depicts a first set of fuel cell subunits (which may include one fuel cell subunit as shown or more fuel cell subunits) and reference numeral 320 depicts a second set of fuel cell subunits. In the current specification, the first set of fuel cell subunits 318 may also be referred to as one or more fuel cell subunits of the plurality of fuel cell subunits and the second set of fuel cell subunits 320 may also be referred to as other fuel cell subunits of the plurality of fuel cell subunits.

As noted hereinabove, a fuel, such as natural gas, is provided to the fuel cells. In one embodiment, the first set of fuel cell subunits 318 and the second set of fuel cell subunits 320 are configured to receive fresh fuel. The fresh fuel may be provided to the first set of fuel cell subunits 318 and the second set of fuel cell subunits 320 via independent fuel channels. In one embodiment, the first set of fuel cell subunits 318 is heated in a first stage and subsequently, the second set of fuel cell subunits 320 is heated in a second stage. In this embodiment, during the first stage, fresh fuel is provided to the first set of fuel cell subunits 318 and the second set of fuel cell subunits 320. Subsequently, during the second stage, supply of the fresh fuel is continued to the second set of fuel cell subunits 320, while the supply of fresh fuel to the first set of fuel cell subunits 318 is discontinued. In this scenario, an exhaust gas of the second set of fuel cell subunits 320 is provided to the first set of fuel cell subunits 318. In this embodiment, the first set of fuel cell subunits 318 may be coupled in series with the second set of fuel cell subunits 320 and hence, the first and second sets of fuel cell subunits 318, 320 are in fluid communication. Specifically, during the second stage, the first and second sets of fuel cell subunits 318, 320 are in fluid communication, thereby aiding in supply of exhaust gas from the second set of fuel cell subunits 320 to the first set of fuel cell subunits 318. The exhaust gas of the first set of fuel cell subunits 318 includes unreacted fuel, which may include methane, carbon monoxide, carbon dioxide, hydrogen, and steam.

Moreover, it may be noted that the number of fuel cells in the first set of fuel cell subunits 318 may be substantially lower than the number of fuel cells in the second set of fuel cell subunits 320. In one example, the number of fuel cells in the first set of fuel cell subunits 318 is 500 and the number of fuel cells in the second set of fuel cell subunits 320 is 2500.

Also, each fuel cell unit 300 is associated with auxiliary loads (not shown in FIG. 3) to generate power. In one embodiment, the auxiliary loads may be shared among the first and second set of fuel cell subunits 318, 320. In another embodiment, each of the first and second set of fuel cell subunits 318, 320 may have a corresponding set of auxiliary loads.

During a start-up operation of the fuel cell unit 300, at the first stage, power from an external power source is provided to auxiliary loads corresponding to the first set of fuel cell subunits 318. In one example, the external power source may be an electrical grid, such as the electrical grid 230 of FIG. 2. The first set of fuel cell subunits 318 is heated based on the power provided from the electrical grid to the corresponding auxiliary loads. Once the first set of fuel cell subunits 318 attains a determined temperature value, the first set of fuel cell subunits 318 generates a corresponding DC power. The DC power generated by the first set of fuel cell subunits 318 is referred to as a fourth DC power In one embodiment, the fourth DC power is conveyed from the first set of fuel cell subunits to the auxiliary loads of the fuel cell unit 300 via the subunit DC bus 313. It may be noted that the fourth DC power is provided to the auxiliary loads in addition to the power provided from the electrical grid 230. The supply of power from the electrical grid 230 to the auxiliary loads is reduced in light of supply of the fourth DC power from the fuel cell unit 300. Thus, less power is imported from the electrical grid 230. At a certain point in time, if the fourth DC power is sufficient for powering all the auxiliary loads of the fuel cell unit 300, no power may be drawn from the external power source.

During the second stage of start-up operation of the fuel cell unit 300, the second set of fuel cell subunits 320 may be heated. Consequently, the second set of fuel cell subunits 320 may generate a corresponding DC power. The power generated by the second set of fuel cell subunits 320 may be referred to as a fifth DC power. The fourth and fifth DC powers are provided to the first DC bus via the subunit DC bus 313. In one example, the fourth power is a first portion of at least one of the first DC power and the second DC power. In another example, the fifth power is a second portion of at least one of the first DC power and the second DC power. It may be noted that a number of fuel cells heated during the first stage is lesser than a number of the fuel cells heated during the second stage.

According to aspects of the present specification, heating the first and second set of fuel cell subunits 318, 320 at different stages aids in reducing the power consumed by auxiliary loads of the fuel cell unit 300 from the electrical grid 230.

Although one set of fuel cell subunits has been shown in FIG. 3 which in one embodiment may be used to start one fuel cell unit that may be used in turn to start other fuel cell units, as discussed above with respect to FIG. 2, in another embodiment, more than one fuel cell unit may have one or more fuel cell subunits that are started simultaneously. In such an embodiment, at least two fuel cell subunits may be heated simultaneously, where at least one of the at least two fuel cell subunits may be situated in a different fuel cell unit than other fuel cell subunit of the at least two fuel cell subunits.

Figure 4:
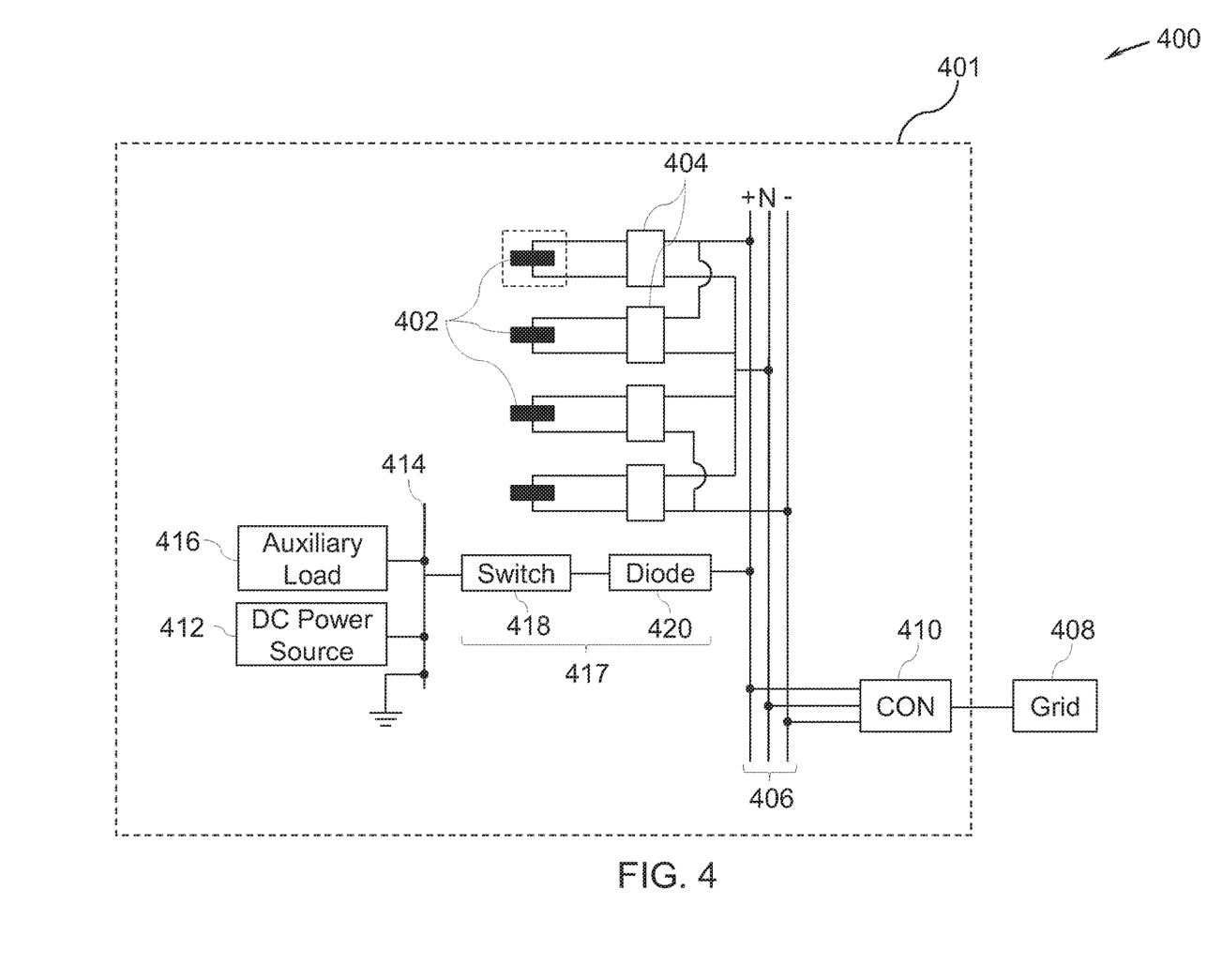
FIG. 4 is a diagrammatical representation of another embodiment of the fuel cell based power generation system of FIG. 1, according to aspects of the present specification.

FIG. 4 is a diagrammatical representation 400 of another embodiment of the fuel cell based power generation system 101 of FIG. 1, according to aspects of the present specification. In particular, FIG. 4 represents a fuel cell based power generation system 401 including a plurality of fuel cell units 402, a plurality of assembly switching elements 404, a first DC bus 406, and a converter 410. The fuel cell based power generation system 401 is coupled to an external power source, such an electrical grid 408. In another embodiment, the external power source may be a battery, an uninterruptible power supply (UPS), a solar based power source, a wind turbine based power source, a thermoelectric device, and another fuel cell based power generation system. In one embodiment, the converter 410 is a bidirectional inverter. In the example of FIG. 4, the first DC bus 406 is a main DC bus and is operatively coupled to the electrical grid 408 via the converter 410.

One fuel cell unit 402 is operatively coupled to another fuel cell unit 402 via a corresponding assembly switching element 404. Additionally, each fuel cell unit 402 is operatively coupled to the first DC bus 406 via the corresponding assembly switching element 404. Further, each fuel cell unit 402 includes a plurality of fuel cell subunits.

Moreover, the fuel cell based power generation system 401 includes a second DC bus 414 and an auxiliary load 416. The second DC bus 414 is an auxiliary DC bus and is operatively coupled to the first DC bus 406 via an auxiliary switching element 417. In one embodiment, the second DC bus is coupled between the auxiliary loads 416 and the first DC bus 406 via the auxiliary switching element 417. In one example, the auxiliary switching element 417 includes a switch 418 and a blocking diode 420. In one example, the switch 418 is a relay. The blocking diode 420 ensures that power flows in a single direction from the first DC bus 406 to the second DC bus 414. It may be noted that in the illustrated embodiment of FIG. 4, the voltage of the first DC bus 406 is higher than the voltage of the second DC bus 414. In one embodiment, the voltage of the second DC bus 414 is allowed to fluctuate within a range of voltage values. In one example, the range of voltage values may be in a range from about 350 volts to about 370 volts.

Also, the fuel cell based power generation system 401 depicted in FIG. 4 for purposes of example includes an additional DC power source 412. The additional DC power source 412 is coupled to the second DC bus 414. In one embodiment, the additional DC power source 412 is a battery.

Further, the auxiliary load 416 is coupled to the second DC bus 414. In this embodiment, the auxiliary load 416 is indirectly coupled to the first DC bus 406. In one embodiment, during the start-up operation of the fuel cell based power generation system 401, the additional DC power source 412 may be used to supply power to at least some of the auxiliary loads 416 of at least one of the fuel cell units of the plurality of fuel cell units. Use of the additional DC power source 412 in the fuel cell based power generation system 401 enables black start of the auxiliary loads 416. The phrase 'black start of the auxiliary loads,' as used herein, refers to initial powering of the auxiliary loads even if the electrical grid 408 is de-coupled from the first DC bus 406. Accordingly, implementing the system 401 as described with reference to FIG. 4 aids in ensuring an uninterrupted supply of power to the auxiliary load 416 even in the absence of supply of power from the electrical grid 408.

FIG. 5 is a flow chart 500 representing a method for operating the fuel cell based power generation system 101 of FIG. 1, according to aspects of the present specification. The method of FIG. 5 is described with respect to the components of FIGS. 1 and 2. In accordance with aspects of the present specification, the method 500 for operating the fuel cell based power generation system 101 includes heating the fuel cell assembly 202 in a plurality of stages, as indicated by step 502. In one example, the plurality of stages includes at least a first stage and a second stage.

In certain embodiments, step 502 of heating the fuel cell assembly 202 in the plurality of stages includes sub-steps 504, 506, and 508. In particular, at sub-step 504, during the first stage of the plurality of stages, at least one first auxiliary load corresponding to at least one fuel cell unit of the plurality of fuel cell units is powered to heat the at least one fuel cell unit. Furthermore, the at least one fuel cell unit attains a determined temperature value consequent to the heating of the at least one fuel cell unit. By way of example, the auxiliary load 238 is provided power from the electrical grid 230 via the converter 232. Consequently, the first fuel cell unit 212 is heated. As noted hereinabove with respect to FIG. 2, the first auxiliary load 238 corresponds to the first fuel cell unit 212. In particular, the first auxiliary load 238 aids in heating the first fuel cell unit 212.

Moreover, at sub-step 506, a first DC power is generated using the heated at least one fuel cell unit. For example, the first fuel cell unit 212 heated at sub-step 504 generates a first DC power once the first fuel cell unit 212 attains the determined temperature value. In one example, the determined temperature value is 750° C. This first DC power is provided to the first DC bus 204. If the value of the first DC power generated by the first fuel cell unit 212 is sufficient to meet the power requirement of the first auxiliary load 238, the first auxiliary load 238 is provided power from the first fuel cell unit 212 instead of from the electrical grid 230.

Furthermore, at sub-step 508, during the second stage of the plurality of stages, at least one second auxiliary load corresponding to other fuel cell units of the plurality of fuel cell units is powered to heat the other fuel cell units based at least on the first DC power to generate a second DC power. In one embodiment, the first DC power generated by the first fuel cell unit 212 along with the power from the electrical grid 230 is provided to the auxiliary loads 240, 242, 244 of the other fuel cell units 214, 216, 218. Consequently, the other fuel cell units 214, 216, 218 are heated.

In certain situations, if the value of the first DC power generated by the first fuel cell unit 212 is sufficient to power the auxiliary loads 240, 242, 244 of the other fuel cell units 214, 216, 218, the converter 232 is configured to stop import of power from the electrical grid 230 for powering the auxiliary loads 240, 242, 244. In this scenario, the other fuel cell units 214, 216, 218 are heated based only on the generated first DC power. The other fuel cell units 214, 216, 218 generate the second DC power based on the heating of the other fuel cell units 214, 216, 218. The second DC power is also provided to the first DC bus 204.

In one embodiment, a portion of the first DC power and the second DC power is used to power the auxiliary loads 240, 242, 244. Further, the remaining portion of the first DC power and the second DC power is provided to the electrical grid 230 via the converter 232. In particular, the controller 112 of FIG. 1 is employed to regulate the converter 232 such that if the first and second DC powers supplied to the first DC bus 204 from the fuel cell assembly 202 exceeds a threshold value, excess power is provided to the electrical grid 230 via the converter 232. Supplying the excess power to the electrical grid 230 by the converter 232 aids in allowing the voltage of the first DC bus 204 to fluctuate within a range of voltage values. In particular, the voltage of the first DC bus 204 may vary between a lower limit of voltage and an upper limit of voltage. In one embodiment, the lower limit and the upper limit of voltage may be determined using the controller 112. Using the exemplary method for operating the fuel cell based power generation system, the power consumed by auxiliary loads from the external power source for heating up the fuel cell assembly is reduced.

Furthermore, the foregoing examples, demonstrations, and process steps such as those that may be performed by the system may be implemented by suitable code on a processor-based system, such as a general-purpose or special-purpose computer. It should also be noted that different implementations of the present technique may perform some or all of the steps described herein in different orders or substantially concurrently, that is, in parallel. Furthermore, the functions may be implemented in a variety of programming languages, including but not limited to C++ or Java. Such code may be stored or adapted for storage on one or more tangible, machine readable media, such as on data repository chips, local or remote hard disks, optical disks (that is, CDs or DVDs), memory or other media, which may be accessed by a processor-based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in the data repository or memory.

Various embodiments of a fuel cell based power generation system and a method of operating the fuel cell based power generation system are presented. The systems and methods presented herein aid in heating the fuel cells of the fuel assembly in two stages. Use of the exemplary fuel cell based power generation system aids in heating a larger set of fuel cells using power provided by a smaller set of fuel cells and the external power source, instead of importing power entirely from the external power source. Accordingly, use of the exemplary fuel cell based power generation system aids in lowering the power consumed from the external power source. Moreover, the fuel cell based power generation system uses switching elements which in turn include switches. Use of these switching elements instead of conventionally employed converters for coupling the fuel cell assembly to the DC bus offers a relatively less expensive and simpler fuel cell based power generation system. The exemplary fuel cell based power generation system may be employed in distributed power generation applications, micro-power generation, small-scale energy generation or larger applications, such as power plants or power stations. Also, the exemplary fuel cell based power generation system may find application in the automotive industry.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

The invention claimed is:

1. A fuel cell based power generation system, comprising:
a fuel cell assembly configured to generate a DC power, the fuel cell assembly comprising a plurality of fuel cell units operatively coupled to one another;
   at least one assembly switching element configured to operatively couple the fuel cell assembly to a first direct current (DC) bus;
   at least one converter coupled between the first DC bus and an electrical grid;
   a plurality of auxiliary loads operatively coupled to the first DC bus at a location between the at least one assembly switching element and the at least one converter,
   wherein each fuel cell unit is configured to include a corresponding auxiliary load,
   wherein the auxiliary loads are configured to heat the fuel cell assembly in a plurality of stages, and
   wherein at least one of the plurality of auxiliary loads is configured to receive power from the fuel cell assembly via the at least one assembly switching element; and
   a controller operatively coupled to the at least one converter, wherein the controller is configured to allow a voltage of the first DC bus to fluctuate within a range of voltage values.

2. The fuel cell based power generation system of claim 1, wherein the at least one converter is configured to transfer electrical power between the electrical grid and at least one of the plurality of auxiliary loads and the fuel cell assembly.

3. The fuel cell based power generation system of claim 1, further comprising a DC power source configured to provide power to at least some of the plurality of auxiliary loads during a startup of the fuel cell assembly.

4. The fuel cell based power generation system of claim 1, wherein the at least one assembly switching element comprises a fuse, a relay, a manually operated switch, a mechanically operated switch, an electromechanically operated switch, a magnetically operated switch, or combinations thereof.

5. The fuel cell based power generation system of claim 1, wherein each of the plurality of fuel cell units comprises a plurality of fuel cell subunits.

6. The fuel cell based power generation system of claim 5, further comprising a plurality of subunit switching units, and wherein the plurality of subunit switching elements is configured to operatively couple the plurality of fuel cell subunits to one another.

7. The fuel cell based power generation system of claim 5, wherein one or more fuel cell subunits of the plurality of fuel cell subunits are configured to receive at least one of a fresh fuel and an exhaust of other fuel cell subunits of the plurality of fuel cell subunits and the other fuel cell subunits of the plurality of fuel cell subunits are configured to receive the fresh fuel.

8. The fuel cell based power generation system of claim 1, further comprising a second DC bus coupled between the plurality of auxiliary loads and the first DC bus via an auxiliary switching element.

9. The fuel cell based power generation system of claim 8, wherein a voltage of the second DC bus is lower than a voltage of the first DC bus.

10. The fuel cell based power generation system of claim 1, wherein the range of voltage values is in a range from about 345 volts to about 420 volts.

11. The fuel cell based power generation system of claim 1, wherein the plurality of auxiliary loads comprises at least one of a fuel blower, an air blower, and an air ventilator.

\* \* \* \* \*

UNITED STATES PATENT AND TRADEMARK OFFICE
CERTIFICATE OF CORRECTION

PATENT NO. : 10,862,301 B2
APPLICATION NO. : 15/869025
DATED : December 8, 2020
INVENTOR(S) : Ralph Teichmann and Honggang Wang It is certified that error appears in the above-identified patent and that said Letters Patent is hereby corrected as shown below:

On the Title Page

Please replace the Title Page with the Attached Title Page

In the Claims

After Claim 11, please insert Claims 12-20 below:

--12. A method for operating the fuel cell based power generation system of claim 1, comprising:
    heating the fuel cell assembly in a plurality of stages, wherein the plurality of stages comprises at least a first stage and a second stage, and wherein heating the fuel cell assembly comprises:
    during the first stage of the plurality of stages, powering at least one first auxiliary load corresponding to a portion or portions of the fuel cell assembly to heat the portion or portions of the fuel cell assembly;
    generating, using the portion or portions of the fuel cell assembly, a first DC power; and
    during the second stage of the plurality of stages, powering at least one second auxiliary load corresponding to another portion or portions of the fuel cell assembly to heat the another portion or portions of the fuel cell assembly based at least in part on the first DC power to generate a second DC power.

13. The method of claim 12, wherein powering the at least one first auxiliary load comprises using an electrical grid, a battery, an uninterruptible power supply, a solar power generation system, a wind based power generation system, a thermoelectric device, another fuel cell based power generation system, or combinations thereof.

14. The method of claim 13, further comprising directing at least a portion of the first DC power and the second DC power to the electrical grid via at least one converter.

15. The method of claim 12, further comprising:

Signed and Sealed this
Twenty-third Day of February, 2021

Drew Hirshfeld
*Performing the Functions and Duties of the
Under Secretary of Commerce for Intellectual Property and
Director of the United States Patent and Trademark Office* determining, using a controller, a range of voltage values corresponding to the first DC bus; and allowing fluctuation of a voltage of the first DC bus within the range of voltage values, using the controller.

16. The method of claim 12, wherein the fuel cell assembly comprises a plurality of fuel cell units, and wherein the portion or portions of the fuel cell assembly heated during the first stage comprise one or more of the plurality of fuel cell units.

17. The method of claim 12, wherein the fuel cell assembly comprises a plurality of fuel cell units, wherein each of the plurality of fuel cell units comprises a plurality of fuel cell subunits, and wherein the portion or portions of the fuel cell assembly heated during the first stage comprise one or more fuel cell subunits of the plurality of fuel cell subunits.

18. The method of claim 17, wherein the portion or portions of the fuel cell assembly heated during the first stage comprise at least two fuel cell subunits, wherein at least one of the at least two fuel cell subunits is situated in a different fuel cell unit than the other of the at least two fuel cell subunits.

19. The method of claim 17, further comprising:
during the first stage, providing a fresh fuel to the one or more fuel cell subunits of the plurality of fuel cell subunits and other fuel cell subunits of the plurality of fuel cell subunits; and
during the second stage, providing the fresh fuel to the other fuel cell subunits of the plurality of fuel cell subunits and an exhaust gas of the other fuel cell subunits of the plurality of fuel cell subunits to the one or more of the plurality of fuel cell subunits.

20. The method of claim 17, wherein each of the fuel cell subunits further comprises a plurality of fuel cells, and wherein a number of fuel cells heated during the first stage is lesser than a number of the fuel cells heated during the second stage.--

(12) United States Patent
Teichmann et al.

(10) Patent No.: US 10,862,301 B2
(45) Date of Patent: Dec. 8, 2020

(54) SYSTEMS AND METHODS FOR POWER GENERATION USING FUEL CELLS

(71) Applicant: CUMMINS ENTERPRISE LLC, Indianapolis, IN (US)

(72) Inventors: Ralph Teichmann, Niskayuna, NY (US); Honggang Wang, Clifton Park, NY (US)

(73) Assignee: CUMMINS ENTERPRISE LLC, Indianapolis, IN (US)

( * ) Notice: Subject to any disclaimer, the term of this patent is extended or adjusted under 35 U.S.C. 154(b) by 260 days.

(21) Appl. No.: 15/869,025

(22) Filed: Jan. 11, 2018

(65) Prior Publication Data
US 2019/0214663 A1 Jul. 11, 2019

(51) Int. Cl.
*H02J 3/00* (2006.01)
*H01M 8/04537* (2016.01)
*H02M 7/797* (2006.01)
*H02J 3/38* (2006.01)
(Continued)

(52) U.S. Cl.
CPC ............ *H02J 3/00* (2013.01); *H01M 8/0488* (2013.01); *H01M 8/04559* (2013.01); *H02J 3/387* (2013.01); *H02M 7/797* (2013.01); *H01M 8/04268* (2013.01); *H02J 2300/30* (2020.01)

(58) Field of Classification Search
CPC .......... H02J 3/00; H02J 3/387; H02J 2300/30; H01M 8/04559; H01M 8/0488; H01M 8/04268; H02M 7/797
See application file for complete search history.

(56) References Cited

U.S. PATENT DOCUMENTS

| 6,812,587 B2 | 11/2004 | Gilbreth et al. |
| 7,880,334 B2 | 2/2011 | Evans et al. |
| 8,263,276 B1 | 9/2012 | Gurunathan et al. |

(Continued)

FOREIGN PATENT DOCUMENTS

| EP | 2587612 B1 | 9/2014 |
| WO | 2004093233 A1 | 10/2004 |

OTHER PUBLICATIONS

Z Miao et al., "Study of a Fuel Cell Power Plant in Power Distribution System—Part I: Dynamic Model", Power Engineering Society General Meeting, 2004. IEEE, vol. 02, pp. 2220-2225, 2004, Denver, CO.
(Continued)

*Primary Examiner* — Carlos Amaya
(74) *Attorney, Agent, or Firm* — Barnes & Thornburg LLP (57) ABSTRACT

A fuel cell based power generation system is presented. The fuel cell based power generation system includes a fuel cell assembly configured to generate a DC power, at least one assembly switching element configured to operatively couple the fuel cell assembly to a first DC bus, at least one converter coupled between the first DC bus and an electrical grid, a plurality of auxiliary loads operatively coupled to the first DC bus at a location between the at least one assembly switching element and the at least one converter, where at least one of the plurality of auxiliary loads is configured to receive power from the fuel cell assembly via the at least one assembly switching element, and a controller operatively coupled to the at least one converter, where the controller is configured to allow a voltage of the first DC bus to fluctuate within a range of voltage values.

20 Claims, 5 Drawing Sheets